(12) United States Patent
Ge et al.

(10) Patent No.: US 7,530,145 B2
(45) Date of Patent: May 12, 2009

(54) COVER RESTRICTING MECHANISM FOR FOLDABLE ELECTRONIC DEVICE

(75) Inventors: Peng-Jin Ge, Shenzhen (CN);
Shui-Yuan Qin, Shenzhen (CN);
Rui-Hao Chen, Shenzhen (CN);
Xing-Huang Luo, Shenzhen (CN);
Hsiao-Hua Tu, Tu-Cheng (TW);
Chia-Hua Chen, Tu-Cheng (TW)

(73) Assignees: Shenzhen Futaihong Precision Industry Co., Ltd., ShenZhen, Guangdong Province (CN); Sutech Trading Limited, Tortola (VG)

( * ) Notice: Subject to any disclaimer, the term of this patent is extended or adjusted under 35 U.S.C. 154(b) by 473 days.

(21) Appl. No.: 11/303,353

(22) Filed: Dec. 16, 2005

(65) Prior Publication Data

US 2006/0143864 A1 Jul. 6, 2006

(30) Foreign Application Priority Data

Dec. 30, 2004 (CN) .................... 2004 2 0103622.9

(51) Int. Cl.
*E05C 17/64* (2006.01)

(52) U.S. Cl. .............................. 16/374; 16/342; 16/328

(58) Field of Classification Search .................... 16/342, 16/330, 303, 374, 325–329, 337, 296–297; 361/680–683; 455/575.1, 575.4, 575.8, 550.1, 455/90.3; 348/373, 794, 333.06; 379/433.12, 379/433.13; 439/165, 164, 162, 446
See application file for complete search history.

(56) References Cited

U.S. PATENT DOCUMENTS

| 5,185,790 | A | * | 2/1993 | Mischneko | ............ | 379/433.13 |
| 5,274,882 | A | * | 1/1994 | Persson | ........................ | 16/303 |
| 5,678,206 | A | * | 10/1997 | Ishii | ........................ | 455/575.8 |
| 5,813,093 | A | * | 9/1998 | Giordano et al. | .............. | 16/329 |
| 6,692,275 | B2 | * | 2/2004 | Lee | ............................. | 439/165 |
| 2004/0244147 | A1 | * | 12/2004 | Qin et al. | ....................... | 16/330 |

* cited by examiner

*Primary Examiner*—Chuck Y. Mah
(74) *Attorney, Agent, or Firm*—Steven M. Reiss

(57) ABSTRACT

A cover restricting mechanism (8) is adapted for use in a foldable electronic device (9). The foldable electronic device includes a cover (10). The cover restricting mechanism includes a projection (31), a housing (20), and a stopping element (32). The projection is provided at one end of the cover. The housing has an inner surface and a corresponding cavity. The stopping element is provided at the inner surface of the housing, and, when the foldable electronic device is in an open position the projection abuts the stopping element. The stopping element is made of an elastomeric material and is configured for slowing the movement of the projection and, thus, the cover once abutment occurs.

10 Claims, 3 Drawing Sheets

COVER RESTRICTING MECHANISM FOR FOLDABLE ELECTRONIC DEVICE

BACKGROUND OF THE INVENTION

1. Field of the Invention

The present invention generally relates to cover restricting mechanisms and, more particularly, to a cover restricting mechanism for a foldable electronic device, such as a mobile telephone, an electronic notebook, and so on.

2. Discussion of the Related Art

With the development of the technologies of wireless communication and information processing, portable electronic devices, such as mobile telephones and electronic notebooks, are now in widespread use. These electronic devices enable consumers to enjoy the convenience of high technology services anytime and anywhere. Foldable electronic devices are particularly welcome by consumers for their convenience.

Generally, foldable electronic devices have most of the electronics in one housing, called the body. The other housing, called the cover, normally contains fewer electronic components than the body. Other foldable electronic devices have all the electronics in the body, with the cover containing no electronics. Various types of hinge assemblies are used to join a body and a cover of a foldable electronic device, so that the cover can unfold up from and fold down upon the body. Manufacturers are constantly seeking to reduce the volume, size, and weight of such foldable electronic devices. Also, it is desirable for the hinge assembly coupling the body with the cover to have a long working lifetime.

A modularized hinge assembly is generally used to hinge together a cover of a foldable electronic device and a body of the foldable electronic device. The hinge assembly typically includes moving parts such as a cam member having a cam surface, a cam follower having a cam follower surface, a spring, a shaft, and a housing. The cam member, the cam follower, and the spring are placed around the shaft and then received in the housing, thereby being held together in a unified structure. The housing is secured to the body, and the cam member engages with the cover. The cam member and the cam follower always contact each other by engagement of the cam and follower surfaces and by the action of the spring. When opening the cover, the cover is rotated by hand, which makes the cam member rotate along with the cover. At the same time, the cam member urges against the cam follower, making the cam follower move along the shaft and thus compress the spring. When the cam member rides over a convex portion of the cam follower, the cover is opened to a predetermined angle. Releasing the cover, the cam follower urges against the cam member, under the force of the spring, and makes the cam member continuously rotate, thus making the cover open fully.

In the above-described hinge assembly, when the cover is opened to a predetermined angle, the cover rotates to a predetermined position. This rotation occurs due to the engaging relationship of the cam follower and the cam member, such engagement being maintained under the force of the spring. However, the abrupt force of the spring of the hinge assembly has a relatively large impact on the cover, which may damage the cover and/or decrease the working lifetime thereof. Such a negative influence on the operation of the cover would expectedly reduce the working lifetime of the foldable electronic device, overall. In addition, many foldable electronic devices need to be opened to other positions, such as 150° or 160° positions. This angle requirement means that the body of the foldable electronic device itself needs to be specially designed in order to limit the maximum opening angle of the cover. This designing often takes up valuable "real estate" on the body, increases the complexity of the manufacture of the body, and/or increases the overall volume and weight of the foldable electronic device. Furthermore, each time the cover is opened, it impacts the body. The body is liable to become worn or damaged due to such impact, thereby shortening the working lifetime of the foldable electronic device.

What is needed, therefore is to provide a cover restricting mechanism that overcomes the above-described problems.

SUMMARY OF THE INVENTION

A cover restricting mechanism is adapted for use in a foldable electronic device. The foldable electronic device includes a cover, in addition to the cover restricting mechanism. The cover restricting mechanism includes a projection, a housing, and a stopping element. The projection is provided at one end of the cover. The housing has an inner surface and a corresponding cavity bounded by the inner surface. The stopping element is provided at the inner surface of the housing (i.e., within the cavity thereof), and when the foldable electronic device is in an open position the projection abuts the stopping element.

When the present cover restricting mechanism is installed in the foldable electronic device, opening and closing the cover is easy. When the user manually rotates the cover to a predetermined angle toward an open position, the restricting mechanism can reduce impact of the cover that could other occur as a result of the abrupt force generated by a spring of a hinge assembly installed in the foldable electronic device. Also, the restricting mechanism can reduce the potential for vibration/shaking of the cover. In addition, the structure of cover restricting mechanism is simple and thus may not increase the volume and/or weight of the foldable electronic device.

Other advantages and novel features of the preferred embodiment will become more apparent from the following detailed description thereof when taken in conjunction with the accompanying drawings.

BRIEF DESCRIPTION OF THE DRAWINGS

Many aspects of the present cover restricting mechanism can be better understood with reference to the following drawings. The components in the drawings are not necessarily to scale, the emphasis instead being placed upon clearly illustrating the principles of the present cover restricting mechanism and its potential applications. Moreover, in the drawings, like reference numerals designate corresponding parts throughout the several views.

DETAILED DESCRIPTION OF PREFERRED EMBODIMENTS

Figure 1:
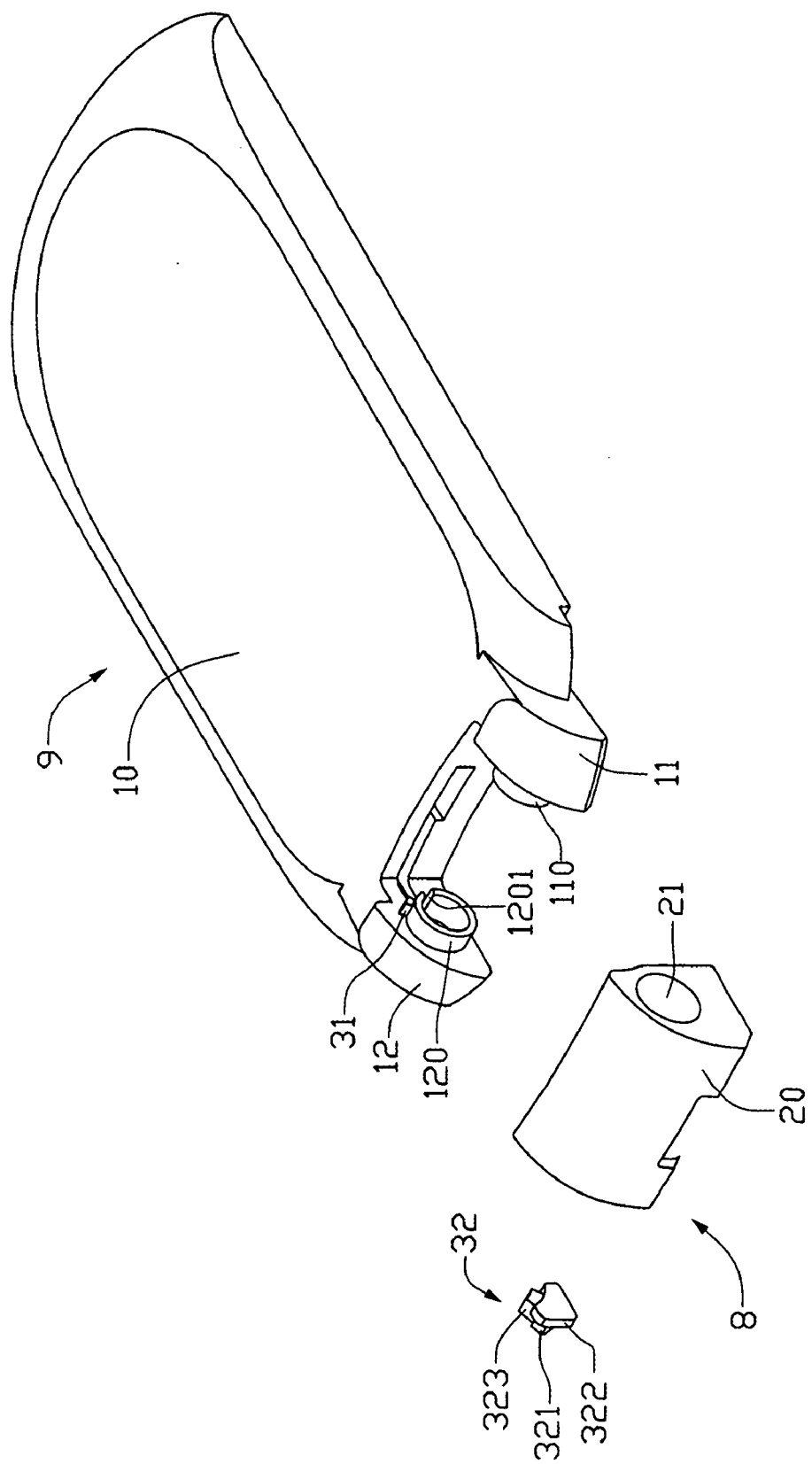
FIG. 1 is an exploded, isometric view of the cover restricting mechanism, incorporated in a foldable electronic device, in accordance with a preferred embodiment.

Referring now to the drawings, FIG. 1 shows a cover restricting mechanism 8 according to an exemplary embodiment of the present mechanism. The cover restricting mechanism 8 is adapted for use in a foldable electronic device 9.

The foldable electronic device 9 includes a body (not shown), a cover 10, a housing 20, and a hinge assembly (not shown). The hinge assembly is contained in the housing 20 and is used to hinge the body and the cover 10 together. The hinge assembly can be any kind of hinge assembly, the hinge assembly generally, for example, including a shaft, a cover driven member, a body driven member, and a spring.

The cover restricting mechanism 8 includes a projection 31, a housing 20, and a stopping element 32. The projection 31 and the stopping element 32 are arranged to be received in the housing 20.

The cover 10 includes a first support portion 11 and a second support portion 12, each of which is formed at a same end of the cover 10 and opposite to each other (i.e., at opposing sides of the cover 10). A column portion 110 and a barrel portion 120, respectively, extend from an interior-facing side of the first support portion 11 and an interior-facing side of the second support portion 12, and such portions 110, 12 face each other. The barrel portion 120 is substantially in the form of a hollow cylinder. The projection 31 is provided on an outer peripheral wall of the barrel portion 120. The barrel portion 120 has a slit 1201 defined therein, extending therethrough parallel to a center axis thereof. The slit 1201 is adjacent to the projection 31. The slit 1201 in the barrel portion 120 permits the barrel portion 120 itself to exhibit a spring quality and thereby an ability to absorb at least a portion of the shock generated upon opening and closing the foldable device 9.

Figure 2:
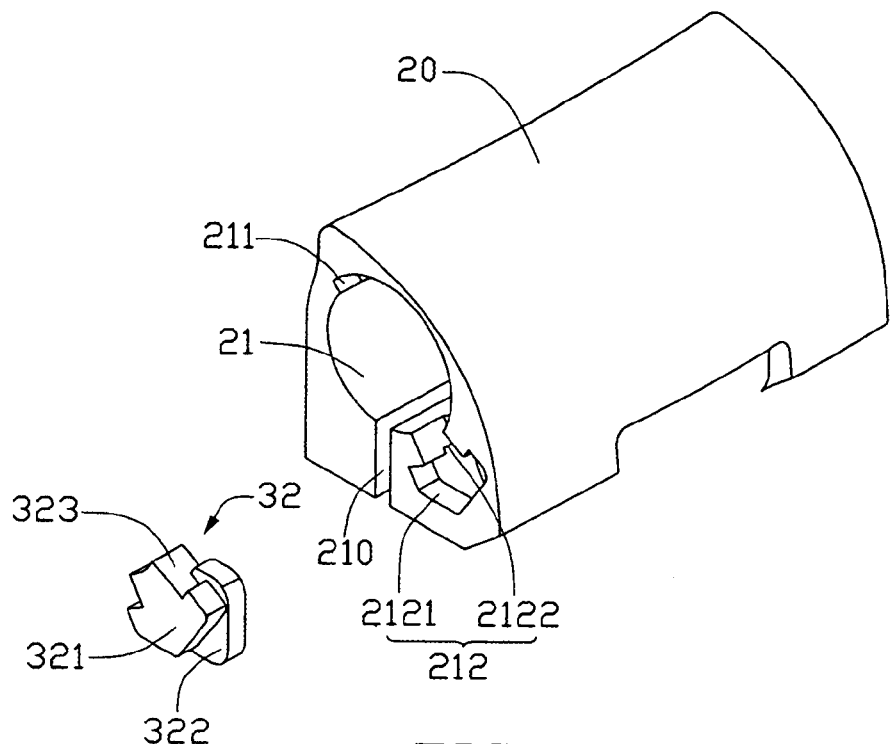
FIG. 2 is an exploded, isometric view of an assembly of a housing and a stopping element of the cover restricting mechanism.

The housing 20 is substantially in the form of a partially hollow quarter-cylinder, and is formed or attached at one end of the body. The housing 20 has a center cavity 21 defined therethrough along a center axis thereof. The center cavity 21 is configured for receiving the column portion 110 of the cover 10, the barrel portion 120 of the cover 10, and the hinge assembly. A diameter of the center cavity 21 is equal to or slightly larger than a diameter of each of the column portion 110 and the barrel portion 120 to facilitate movement of the cover 10 relative to the housing 20. Referring also to FIG. 2, the housing 20 has a channel 210, an arc slot 211, and a receiving hole 212 defined therein. The channel 210 is formed in a wall of the housing 20, generally parallel and radial to a center axis thereof. The channel 210 communicates with the center cavity 21 of the housing 20. The arc slot 211 is formed in an inner wall/facing of the housing 20 and adjacent one end thereof. The arc slot 211 communicates with the center cavity 21 of the housing 20 and is configured for receiving and engaging with the projection 31, so that the projection 31 is slidable along the arc slot 211. The receiving hole 212 includes a first receiving hole portion 2121 and a second receiving hole portion 2122. The first receiving hole portion 2121 is formed at an end of the housing 20 and communicates (i.e., joins, interconnects) with the center cavity 21 of the housing 20 and the arc slot 211. The second receiving hole portion 2122 is formed adjacent the first receiving hole portion 2121 and openly adjoins (i.e., communicates) with the first receiving hole portion 2121.

The stopping element 32 is made of elastic rubber or another suitably elastomeric material. The stopping element 32 includes a first positioning portion 321, a second positioning portion 322, and a protrusion 323. The first positioning portion 321 joins the second positioning portion 322. The protrusion 323 extends from one common end of the first positioning portion 321 and the second positioning portion 322. The first positioning portion 321 and the protrusion 323 are configured to be received (i.e., inserted/fit) in the first receiving hole portion 2121, such that the protrusion 323 protrudes in the arc slot 211 of the housing 20 and not in the center cavity 21 of the housing 20. The second positioning portion 322 is configured to be received (i.e., inserted/fit) in the second receiving hole portion 2122. The size of the second positioning portion 322 is larger than that of the first positioning portion 321, so that the stopping element 32 is secured in the receiving hole 212. The shape, arrangement, and material make-up of the protrusion 323 allow it act like a spring and thereby absorb a portion of the force placed upon the protrusion 323 by the hinge assembly during opening, thus slowing its travel and, accordingly, that of the cover 10. As such, the protrusion 323 helps promote a long working lifetime for the stopping element 32.

Figure 3:
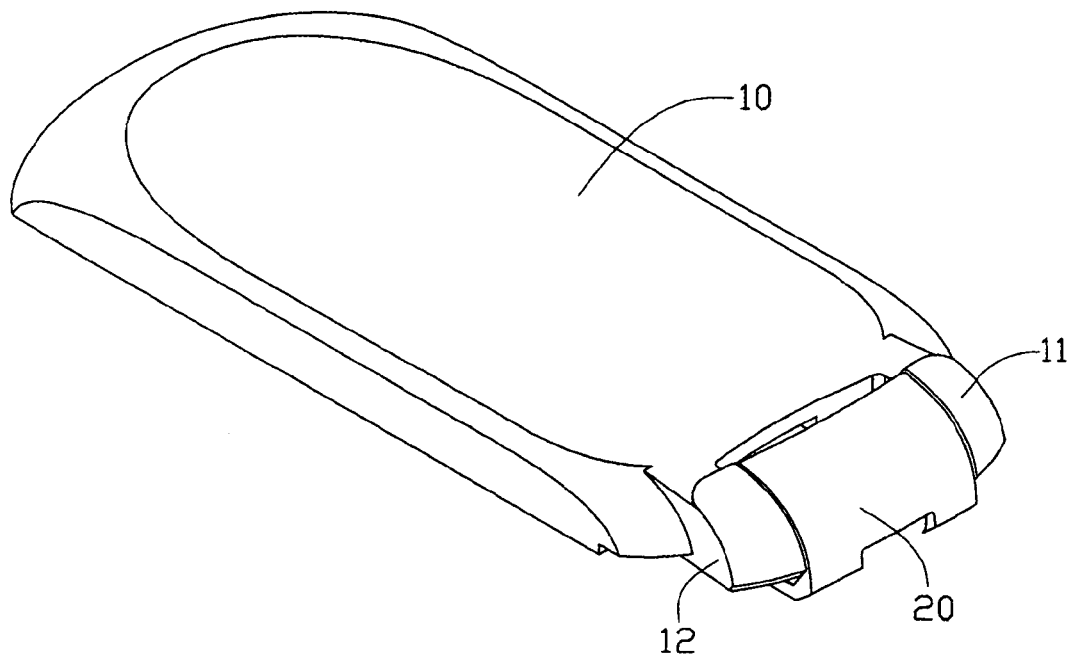
FIG. 3 is an isometric view of a cover incorporating the cover restricting mechanism.

In assembly, the stopping element 32 is inserted into the receiving hole 212 of the housing 20, thereby engaging with the housing 20. The first positioning portion 321 and the protrusion 323 of the stopping element 32 are received in the first receiving hole portion 2121 of the receiving hole 212, the protrusion 323 protruding in the arc slot 211 of the housing 20. The second positioning portion 322 of the stopping element 32 is received in the second receiving hole portion 2122 of the receiving hole 212. The hinge assembly is inserted into the center cavity 21 of the housing 20. The housing 20 is mounted to the end of the cover 10 via the column portion 110 and the barrel portion 120 thereof. The barrel portion 120 is received in one end of the housing 20, and the column portion 110 is received in an opposite end of the housing 20, as represented in FIG. 3. Also referring to FIG. 4, the projection 31 is received in one end of the arc slot 211 of the housing 20. The angular width (i.e., arcuate range) of the arc slot 211 mainly limits the angular motion range of the projection 31. Wires may connect circuits in the cover 10 with circuits in the body by means of the slit 1201 of the cover 10 and the channel 210 of the housing 20 (wires and circuits, not shown).

Figure 4:
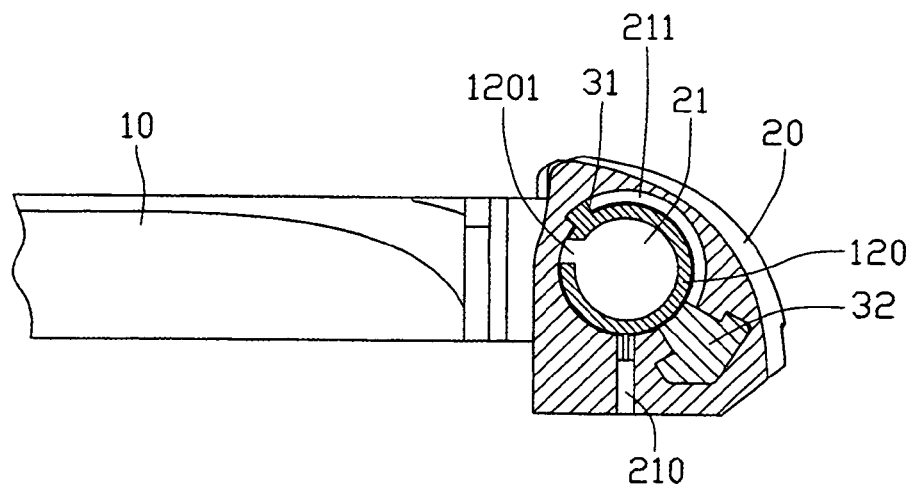
FIG. 4 is a partial cross-sectional view of the cover restricting mechanism, corresponding to a closed position of the foldable electronic device.
Figure 5:
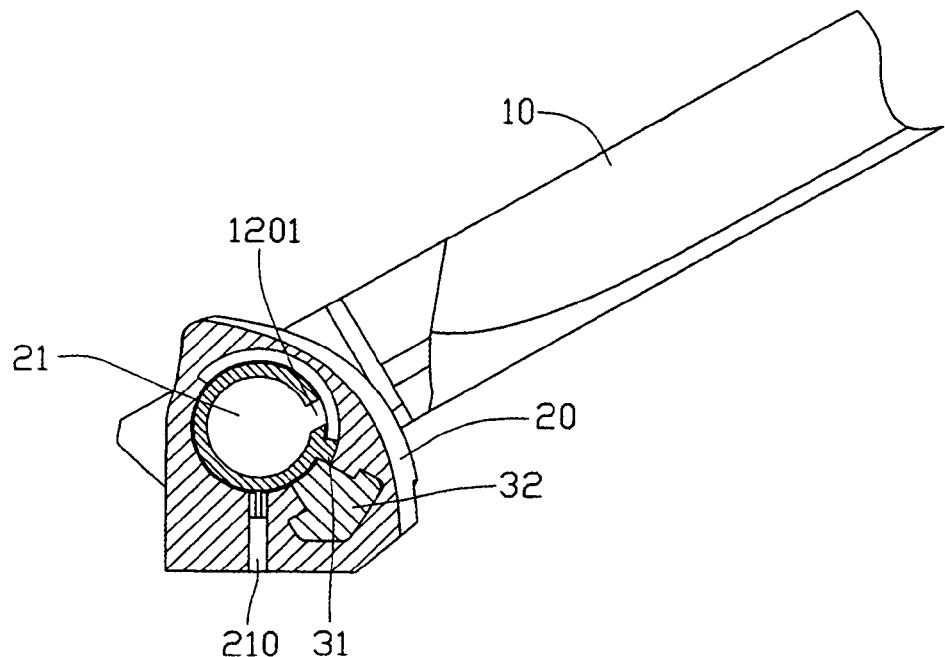
FIG. 5 is similar to FIG. 4, but showing the cover restricting mechanism corresponding to an open position of the foldable electronic device.

Referring to FIGS. 4-5, in use, when a user wants to open the cover 10, he/she may manually rotate the cover 10 up to an open position. When the cover 10 is opened to a predetermined angle, the cover 10 is opened automatically under the force of the spring of the hinge assembly because of the release of the hinge spring. When the projection 31 contacts and abuts the protrusion 323 of the stopping element 32, the cover 10 is opened substantially to a full-open position, and the protrusion 323, being made of an elastomeric material, is compressed and produces a resilient force. The moving rate of the cover 10 is accordingly slowed down, as a result of the increasing resilient action of the protrusion 323 and the decreasing resilient action of the hinge spring. The cover 10 continuously and slightly further rotates until the resilient force of the protrusion 323 is balanced with the force of the spring.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A cover restricting mechanism for a foldable electronic device, the cover restricting mechanism comprising:
   a cover having a substantially hollow cylindrical barrel portion having an curved outer peripheral wall and a projection provided on the curved outer peripheral wall;
   a housing configured for coupling with the cover, the housing having an arcuate inner surface and defining a cavity, the arcuate inner surface defining a slot having an arcuate surface and communicating with the cavity, the projection engaging in the slot; and
   a stopping element provided at the housing, the stopping clement including a protrusion protruding in the slot, the projection sliding along the slot and being abuttingly engageable with the protrusion.

2. The cover restricting mechanism as claimed in claim 1, wherein the stopping element includes a positioning portion and the protrusion extends from the positioning portion.

3. The cover restricting mechanism as claimed in claim 2, wherein the housing has a receiving hole, the receiving hole communicating with the cavity of the housing, and the stopping element engaging the housing within the receiving hole.

4. The cover restricting mechanism as claimed in claim 2, wherein the stopping mechanism is comprised of an elastomeric material, the protrusion of the stopping mechanism being configured for slowing movement of the projection upon contact therewith, due to a resilient behavior of the elastomeric material.

5. The cover restricting mechanism as claimed in claim 1, wherein the housing has a channel, parallel and radial to a center axis of the housing, the channel openly adjoining with the cavity of the housing.

6. The cover restricting mechanism as claimed in claim 1, wherein the cover includes a first support portion and a second support portion, the two support portions are provided at a same end of the cover.

7. The cover restricting mechanism as claimed in claim 6, wherein the barrel portion extends from a side of the second support portion.

8. The cover restricting mechanism as claimed in claim 7, wherein the barrel portion has a slit defined therethrough parallel to a center axis thereof, the slit being adjacent to the projection.

9. A foldable electronic device, comprising:
   a cover having a substantially hollow cylindrical barrel portion having an curved outer peripheral wall; and
   a cover restricting mechanism, comprising:
      a projection provided on the curved outer peripheral wall;
      a housing coupled with the cover, the housing having an arcuate inner surface defining a cavity, the arucate inner surface defining a slot having an arcuate surface and communicating with the cavity, the projection engaging in the slot; and
      a stopping element provided at the housing, the stopping element including a protrusion protruding in the slot, the projection sliding along the slot and being abuttingly engageable with the protrusion.

10. The foldable electronic device as claimed in claim 9, wherein the barrel portion has a slit defined therethrough parallel to a center axis thereof, the slit is adjacent to the projection, and the barrel portion is received in the cavity.

* * * * *